Figure 1:
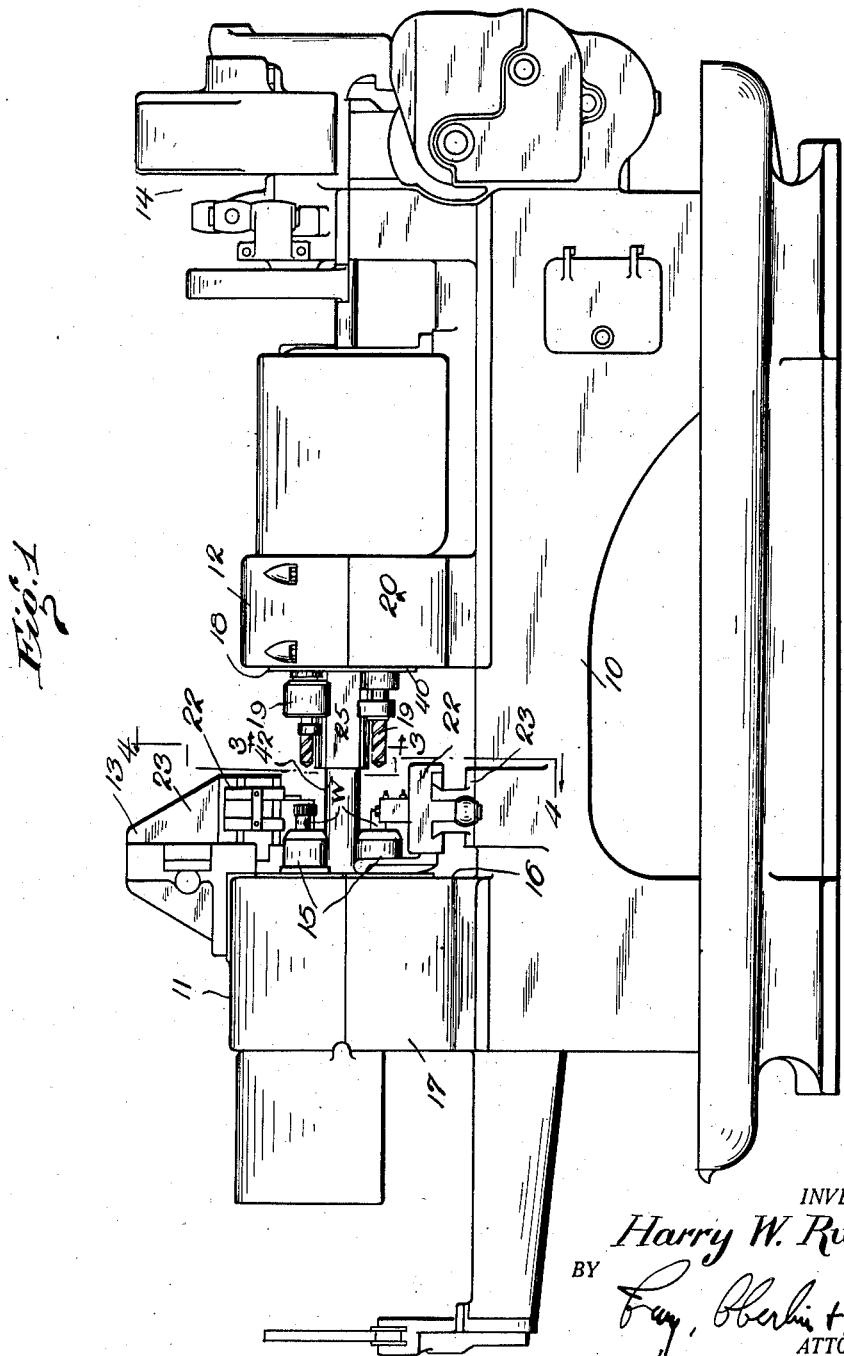

July 31, 1934.  H. W. RUPPLE  1,968,538
TOOL CARRIER FOR MULTIPLE SPINDLE SCREW MACHINES
Filed May 1, 1930   6 Sheets-Sheet 3

INVENTOR.
Harry W. Rupple
BY
ATTORNEYS

July 31, 1934.   H. W. RUPPLE   1,968,538
TOOL CARRIER FOR MULTIPLE SPINDLE SCREW MACHINES
Filed May 1, 1930   6 Sheets-Sheet 4
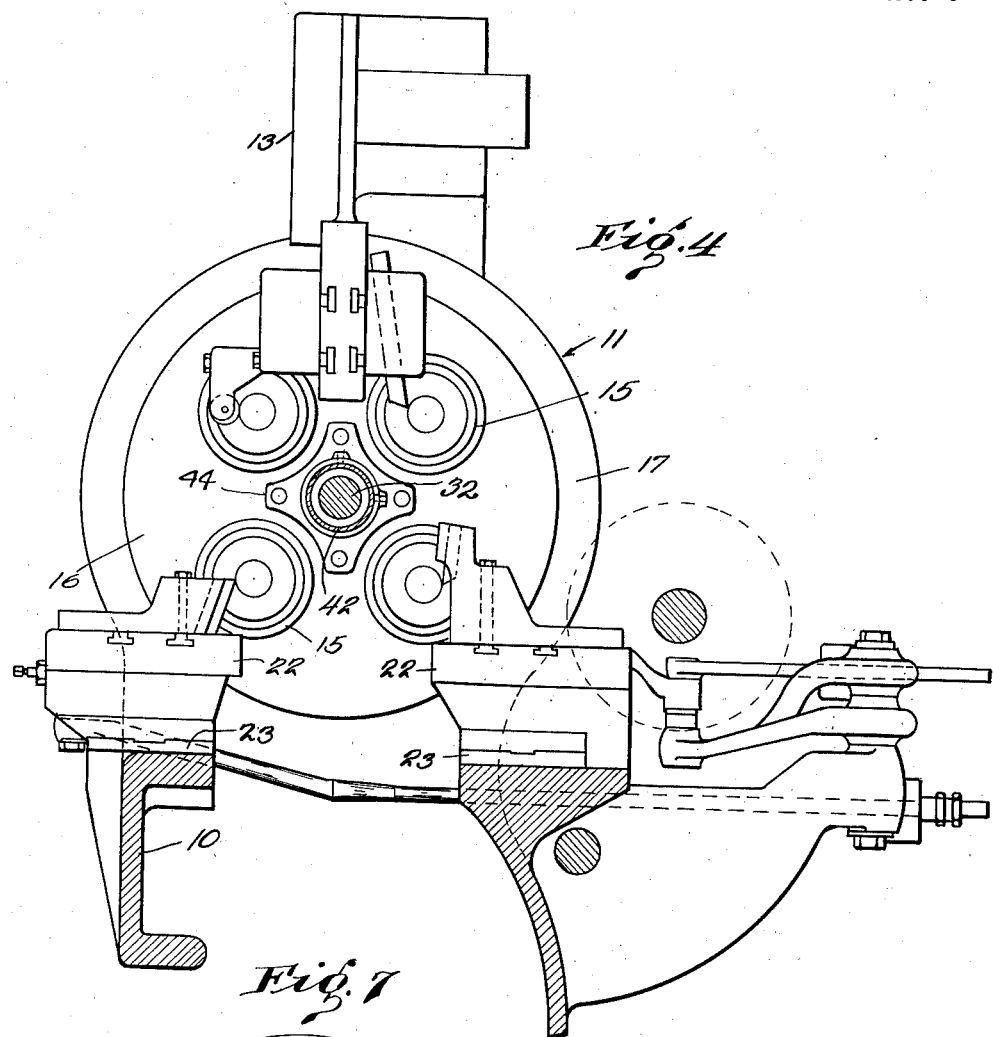
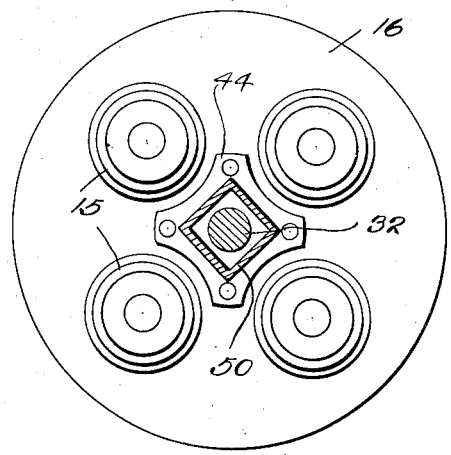
INVENTOR.
Harry W. Rupple
BY
ATTORNEYS

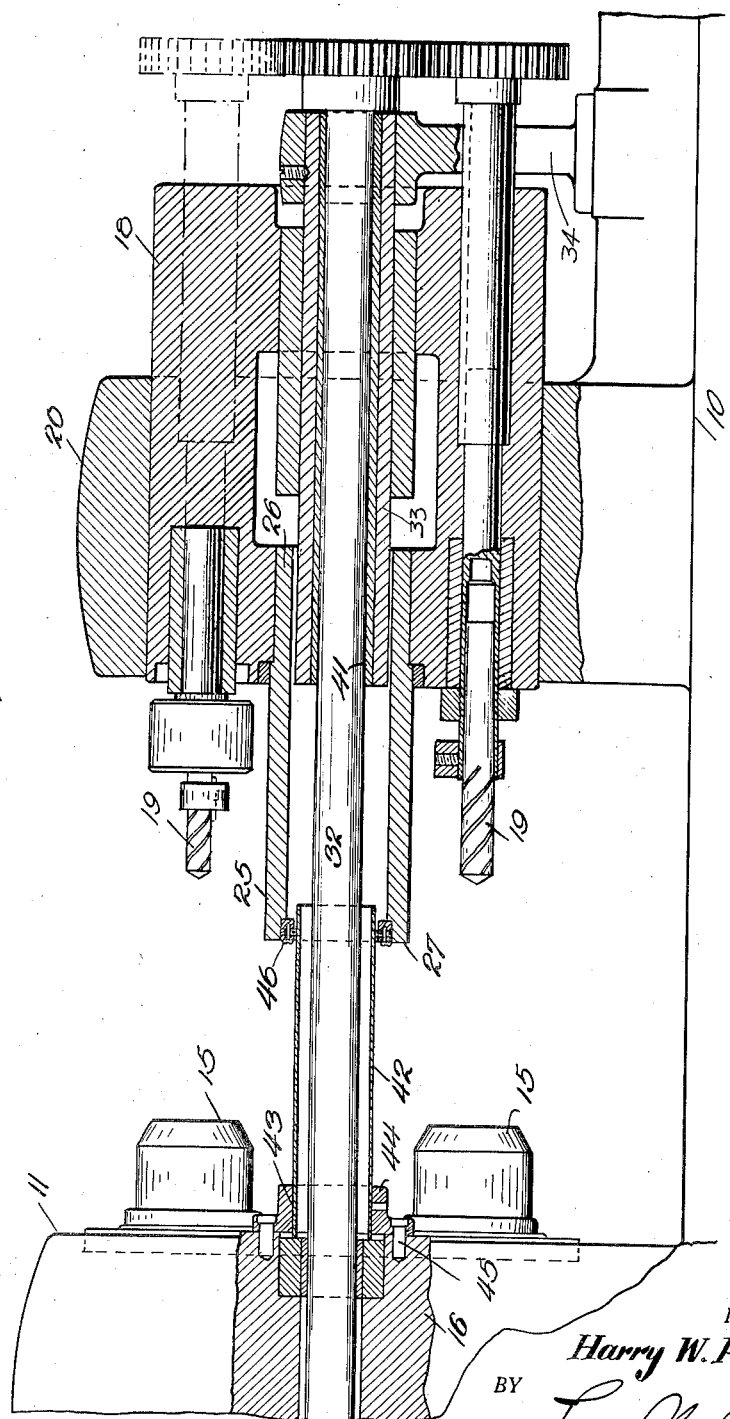

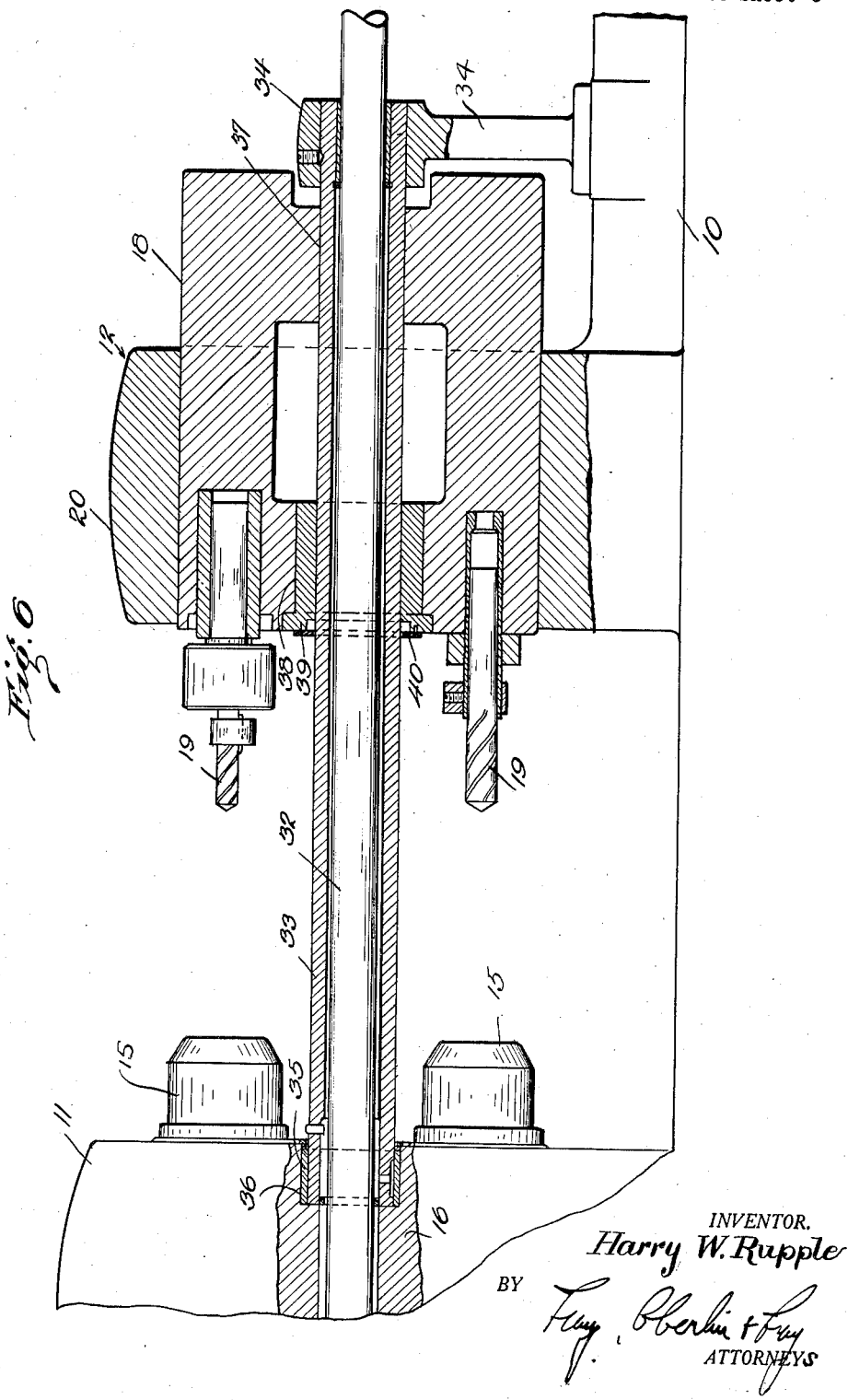

Patented July 31, 1934

1,968,538

UNITED STATES PATENT OFFICE 1,968,538

TOOL CARRIER FOR MULTIPLE SPINDLE SCREW MACHINES

Harry W. Rupple, Cleveland, Ohio, assignor to The Cleveland Automatic Machine Company, Cleveland, Ohio, a corporation of Ohio Application May 1, 1930, Serial No. 448,970

1 Claim. (Cl. 29—37)

This invention, relating, as indicated, to metal working machines of the multiple spindle variety, wherein a plurality of pieces of work are carried in a number of rotating spindles and several tools are mounted in a tool slide opposed to the work spindles, refers more particularly to an improved supplemental tool carrier supported between the work and tool slide proper to afford an increase in tooling possibilities, greater accuracy in operation, and an increase in production.

The invention concerns more especially an attachment device which may be installed in the assembly of the main tool slide of machines of the "Cleveland automatic" type which are characterized by the shape of the tool slide; this latter being in the form of an enlarged cylinder arranged axially of the machine and being supported for sliding movement in an external cylindrical bearing which distinguishes it from the other types of tool slides having a footed extension sliding in ways on the machine bed. Among the main advantages of the "Cleveland automatic" type of tool slide over such other types is the rigidity in the support of the tools irrespective of the direction of strain caused by the cutting engagement of such tools with the work. I am aware of attachments of a character similar to the present one, but they must all of necessity be supported additionally to their mounting in the main tool slide to obtain the required rigidity.

In my attachment I find the form of supplemental slide and carrier employed and its mode of mounting in the main tool slide, adequate to afford the required resistance to the side strain of the tool, and thereby to eliminate the necessity and expense of additional attachment supports.

A further advantage of this invention resides in the provision of an improved chip guard which is adapted to be carried by the work spindle turret to surround the main drive shaft, which, in machines of the present character, extends longitudinally of the machine, co-axially of the spindle turret and main tool slide. As has been stated, my improved supplemental tool carrier is unsupported in its front end, and to prevent the ingress of chips or metal particles into the space between such supplemental tool carrier and the main drive shaft, I extend the forward end of the chip guard to within the outer end of such carrier when the latter is in retracted position, and provide also a wiper or washer member between the outer surface of the guard and the inner surface of the carrier. This improved chip guard is to protect the surface of the drive shaft from falling finished articles or particles of metal removed from the work, and also to prevent chips from winding upon the rotating shaft. In one form of my invention the chip guard may assume a polygonal outer shape having the corners or angular portions of its surface positioned between each two respective work carrying spindles, in this manner acting to better shed the cut chips away from the drive shaft. It will be understood that such chip guard indexes with the rotation of the spindle turret, and thus maintains at all times the relationship between the guard and spindles.

To the accomplishment of the foregoing and related ends, said invention then, consists of the means hereinafter fully described and particularly pointed out in the claims; the annexed drawings and the following description setting forth in detail one method and one product exemplifying my invention, such disclosed procedure and product consisting, however, but one of various applications of the principles of my invention.

In said annexed drawings:—

Figure 2:
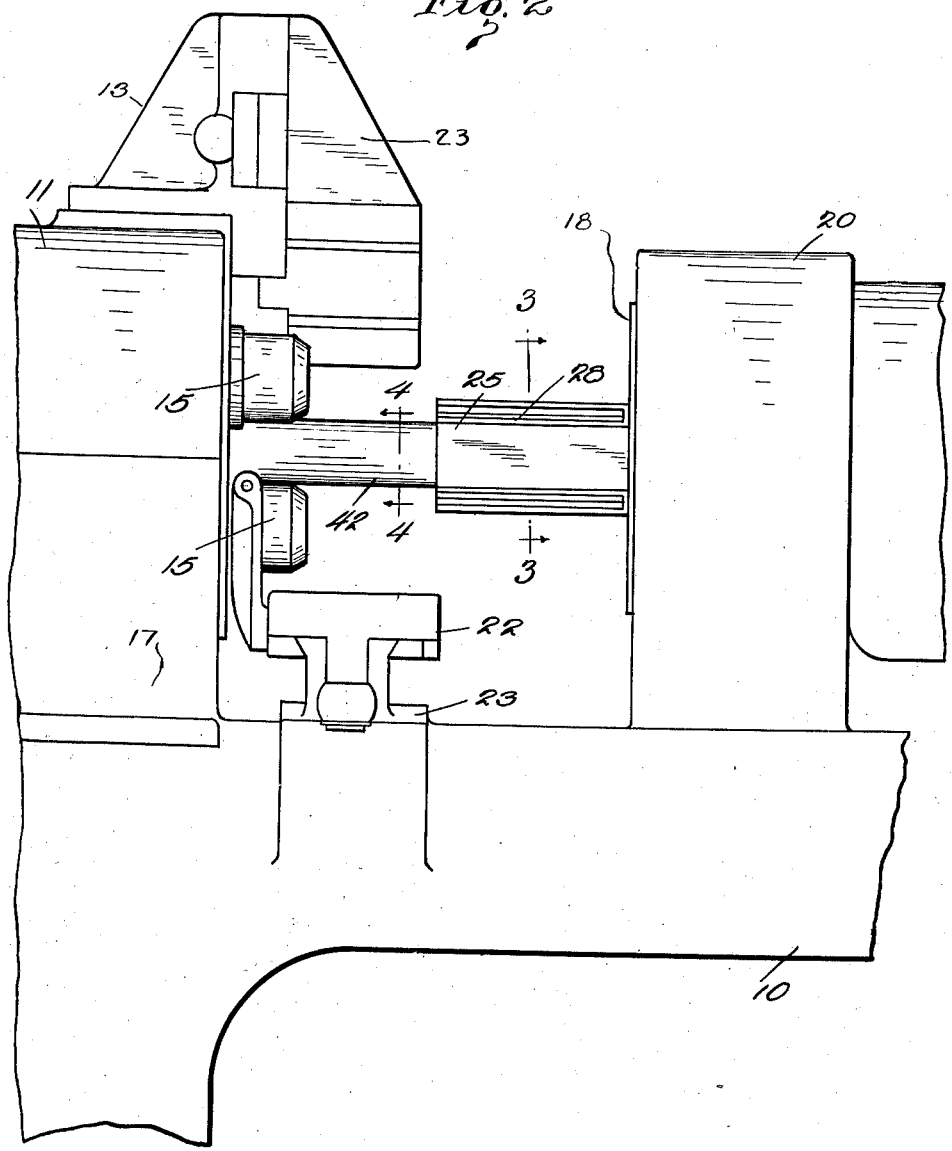
Figure 3:
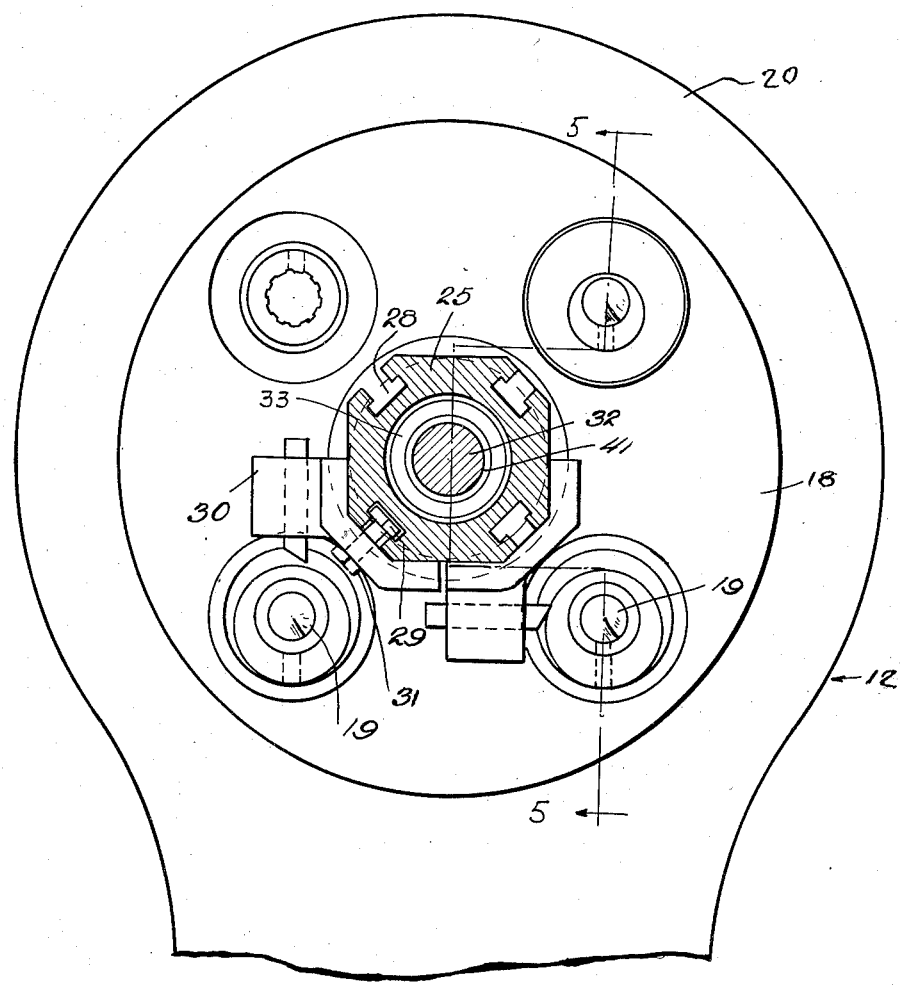

Fig. 1 is a front elevational view of a multiple spindle screw machine of the "Cleveland automatic" type having applied thereto a preferred form of the present novel supplemental tool carrier and chip guard; Fig. 2 is a view similar to Fig. 1 on an enlarged scale of the essential parts only concerned with this invention; Fig. 3 is a vertical transverse section taken on the line 3—3 of Figs. 1 and 2; Fig. 4 is a vertical transverse section taken on the line 4—4 of Figs. 1 and 2; Fig. 5 is a longitudinal vertical section with portions in elevation taken through the axis of the machine from the front end of the spindle turret through the tool slide approximately on line 5—5 of Fig. 3; Fig. 6 is a view similar to Fig. 5 showing a construction without the supplemental tool carrier; and Fig. 7 is a view similar to Fig. 4 showing a modified form of chip guard.

As hereinbefore stated, my invention particularly concerns an improved tool carrier for multiple spindle machines of the "Cleveland automatic" type, and accordingly such a machine is found illustrated in the accompanying drawings, wherein the base or bed plate is indicated at 10, the work or stock carriers and associated elements generally at 11, the longitudinal tool carrier at 12, the transverse tool carriers at 13, and the driving or power mechanism at 14. As is customary, the work carriers are in the form of parallel spindles 15 mounted at one end of the bed 10 in a longitudinally arranged spindle turret 16 supported for rotation in an encircling housing 17 secured to the bed; the main tool carrier or slide 18 is mounted to slide co-axially of the spindle turret so as to present a plurality of tools 19 simultaneously to the several pieces of work W held in the spindles; and the driving mechanism 14 is mounted at the other end of the machine and has a rotating shaft 32 extending therefrom co-axially of the main tool slide and spindle turret from which the several spindles 15 are rotated. The main tool slide 18 is reciprocably journaled in an enlarged housing 20, fixed to the top of the bed 10, and fitting closely the outer surface of the slide 18 for the greater part of its length. A cam shaft and cams (not shown) of usual construction are employed to effect the intermittent reciprocation of the tool slide 18 in timed relation with other mechanisms (also not shown) for indexing the spindle turret step by step at each reciprocation of the tool slide so as to present the several pieces of work to a different series of tools during each operation in the cycle of the machine. The various transverse slides or tool carriers 22 are mounted on ways 23 provided on the bed 10 and the front face of the turret housing 17.

The foregoing description relates to the customary construction of machines of the present character which are adapted to form completely one piece at each step in the cycle of operation of the machine. The work which usually is in bar form is fed through the several spindles and is operated upon by both the tools in the main slide and in the transverse slides. The tools in the slide 18 operate upon the forward end of the work pieces to perform threading, drilling, reaming, box milling or like operations, while the other tools, i. e., those carried by the transverse slides, perform side turning or like forming operations and also the cutting off of the finished articles from the bar stock.

It has been found desirable in working on pieces of considerable length to provide additional supports for the tools close to the work, or, on the other hand, supports for the work at its outer end close to the tools. Heretofore, when performing drilling or box milling operations upon long pieces of work the tools carried in the main slide had a considerable overhang, i. e., the distance between their outer cutting point and their mounting in the slide 18 was necessarily considerable to provide for a long cut upon the piece of work, and hence there was a tendency of the tools to spring laterally which prevented the production of accurate work. Likewise, when the work projects a considerable distance beyond the front end of the spindles it is free of support at its outer end and is apt to whip, due to the high rotation of the spindles, and it has been difficult to accurately drill or form these long pieces by tools held in end relationship in the longitudinal tool slide 18. Furthermore, in some other instances it is highly desirable to provide at one station, i. e., in one tool position in the slide, means for carrying a number of tools which may simultaneously operate upon a single piece of work. This has sometimes been done by providing a tool adapted for support by its shank in the tool slide 18, and having stepped overhanging portions each of which carry individual tools. However, the greater the number of such tools and the further they are projected beyond the surface of the tool slide 18 the less rigidly are they supported, and consequently the more inaccurate will be the result upon the work. Also, in ordinary construction, it is practically impossible to employ at a single tool station, a box mill or like tool and a rotating drill.

My invention, as stated above, contemplates the provision of a novel form of supplemental tool carrier or attachment which is supported and carried by a main tool slide 18, and which is adapted to provide for a very material increase in the tooling possibilities of the machine. In the preferred form of my invention, as illustrated in the drawings, this suplemental tool carrier or attachment, shown in cross section in Figs. 3 and 5, at 25, consists of a longitudinally extending substantially rectangular member having one end 26 fixed within a suitable recess in the slide 18, and its other end 27 projected toward the stock carrying spindles 15. In the assembly of the supplemental slide 25, in the present multiple spindle machine, such slide is mounted co-axially of the spindle turret and tool slide 18 so that tools supported thereby may act upon any piece of work carried by the several spindles 15. As seen in Fig. 3, the slide 25 is longitudinally grooved at several points to provide for the attachment of various tools. The grooves indicated by numeral 28 are of the ordinary T shaped variety to receive the head of a bolt 29 which projects outwardly through tool 30 mounted against the face of the slide 25. A nut 31 serves to lock the tool 30 in place.

The supplemental tool carrier 25, as has been stated, is in the form of an attachment, and the machine parts associated therewith have been so constructed that the slide 25 may be assembled therewith without changing the machine elements. This feature is illustrated in Figs. 5 and 6. In the latter the machine is seen without the supplemental tool slide and comprises the spindle turret 16, the main tool slide 18, its supporting housing 20, and the main drive shaft 32 which passes longitudinally through the tool carrier 18 and spindle turret 16. A tubular member 33 is provided around the shaft 32 from the outside of the slide 18 to the forward end of the spindle turret 16, this tube serving as a guard for the rotating main drive shaft. At the end adjacent the slide 18 the tube 33 is received in a bracket 34 mounted on the top of bed 10, and the other end of such tube is supported by a bushing 35 inserted in an aperture 36 in the spindle turret 16. The slide 18 in internally bored, as at 37, to slidably engage the outer surface of the tube 33. Such slide 18 is also cylindrically bored at its forward end, as at 38, to provide for the insertion of an annular hub or spacer sleeve 39, or the end 26 of slide 25, as will be described hereinafter. The sleeve 39 serves when the machine does not incorporate the supplemental tool slide or carrier to fill the space between the bore 38 and the outer surface of tube 33 to prevent the ingress of chips or metal particles along such tube to the inside of the main tool slide 18. A wiper 40 may be secured to the outer face of the sleeve 39 to further insure the passage of chips internally of the main tool slide. The fit between the slide 18 and the sleeve 39 is a driving one which satisfactorily holds the member 39 in place, but permits its ready removal for the assembly of slide 25 in the bore 38.

When, as illustrated in Fig. 5, the slide 25 is assembled with the slide 18, there is no longer a need for the tubular member 33 beyond the forward end of slide 18, consequently, such tube is cut off approximately flush with the front face of slide 18, and a bushing 41 inserted between it and the rotating shaft 32. The slide 25, as has been described, extends into the space between the main tool carrier 18 and the spindle turret around the drive shaft 32, and serves to protect such shaft from the chips cut from the work by the tools carried in both the main tool slide and the supplemental tool slide 25. To protect the shaft for its length between the outer end of slide 25 and the front of the spindle turret, I employ a chip guard which is in the form of a light metal tube 42 mounted at one end 43 in a collar 44 secured to the front face of the spindle turret 16 by suitable bolts or screws 45. The other end of the tube 42 projects internally of the forward end of slide 25, providing however, no support for such slide. At 46, Fig. 5, there is shown a flexible or leather washer between the interior of slide 25 and the outer surface of the tube 42, which serves to prevent the entrance of chips or metal particles into the space between the slide 25 and shaft 32.

Particular mention has been made in the foregoing description of the "Cleveland automatic" type of main tool slide which is in the form of a cylindrical member supported for the greater part of its length in an encircling housing to move toward and away from the spindle turret. Through many years of actual experience in the use of this particular type of construction it is found that there may be no deflection of the main tool slide caused from the engagement of the tools with the work, the slide being supported at every point around its circumference. Consequently, in the adaptation of machines of this type to a supplemental tool carrier for supporting tools considerably in advance of the front face of the main tool slide, it is found that there is no necessity of supporting such supplemental tool carrier other than by its attachment to the slide 18. It must, of course, be considered that the structure of the slide 25 itself be sufficient to withstand the side thrust of the tools. The point emphasized at this time is that the other types of constructions having the main tool slide movably supported at one side only, as by a footed extension sliding in ways or guides of a machine, the force exerted by the cutting tools upon the supplemental tool carrier employed with said other types of constructions, is multiplied and is of sufficient leverage to materially deflect or spring the main tool slide as a unit unless such supplemental tool carrier be provided with additional means of support, particularly at its forward end. It may again be emphasized that with the construction illustrated in the present drawings the main tool slide 18 is supported over its entire surface at every circumferential point, and that any strain upon the supplemental tool carrier, even at its outer end, will be equally distributed over the entire bearing for the slide 18.

In Fig. 7 there is found a modification of the chip guard carried by the spindle turret. In this form the chip guard 50 is rectangular in cross section receiving internally thereof the drive shaft 32, and adapted to have its forward end telescopically received without actual contact within the interior of slide 25. Its other end may be suitably secured to the spindle turret so as to be carried thereby. A particular advantage in this form of chip guard is its ability to shed the falling chips from the area between the spindles or work. As seen in the illustration, the guard 50 has its corners or angular portions positioned between each two respective work carrying spindles, and will at all times, due to its fixed attachment to the spindle turret, provide a sharply inclined surface upon which the metal chips may slide toward the end of the machine.

In the use of my improved supplemental tool carrier, side forming tools or box mills may be mounted directly, as best seen in Figs. 3 and 5, upon the slide 25, one or more in line in each tooling position, and an additional end forming tool such as a fixed or rotating drill or reamer or threading device employed in the tool supporting position of the slide 18. It will be apparent therefrom that I have devised an improvement which not only increases the accuracy in the work but makes capable the performance of operations impossible from tools supported only by the main tool slide.

Other forms may be employed embodying the features of my invention instead of the one here explained, change being made in the form or construction, provided the element stated by any of the following claims or the equivalent of such stated elements be employed, whether produced by my preferred method or by other embodying steps equivalent to those stated in the following claim.

I claim:

In a machine tool of the character described, the combination of a frame provided with a plurality of spaced axially aligned cylinders, an indexible cylindrical spindle turret rotatably supported in one of said cylinders, a cylindrical tool slide supported for longitudinal movement in the other of said cylinders, an auxiliary tool slide supported by said cylindrical tool slide coaxial therewith and projecting towards said spindle turret, a plurality of spindles rotatably supported in said spindle turret, a drive shaft for rotating said spindles extending through said tool slides and projecting into said spindle turret coaxial with said cylinders, a tubular member surrounding said drive shaft connected integral with said spindle turret and projecting into said auxiliary tool slide, and a wiper carried by said auxiliary tool slide at the end thereof adjacent said spindle turret and engaging said tubular member.

HARRY W. RUPPLE.